United States Patent [19]

Giunta

[11] Patent Number: 5,998,527

[45] Date of Patent: *Dec. 7, 1999

[54] FILLER PRIMER CONTAINING NO ORGANIC SOLVENTS FOR REPAIR CAR-REFINISHING

[75] Inventor: Andrea Giunta, Milan, Italy

[73] Assignee: MaxMeyer Car s.r.l., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/663,632

[22] Filed: Jun. 14, 1996

[30] Foreign Application Priority Data

Jun. 23, 1995 [IT] Italy .................................. MI95A1358

[51] Int. Cl.⁶ ................................. C08J 3/00; C08K 3/20; C08K 3/18; C08L 75/00

[52] U.S. Cl. ........................... 524/431; 524/539; 524/591; 524/839; 524/840

[58] Field of Search .................................... 524/539, 591, 524/839, 840, 431

[56] References Cited

U.S. PATENT DOCUMENTS

| | | | |
|---|---|---|---|
| 4,742,095 | 5/1988 | Markusch et al. | 523/322 |
| 5,352,733 | 10/1994 | Hart | 524/840 |
| 5,354,807 | 10/1994 | Dochniak | 524/591 |

*Primary Examiner*—Patrick D. Niland
*Attorney, Agent, or Firm*—Griffin, Butler, Whisenhunt & Szipl, LLP

[57] ABSTRACT

This is a description of a filler primer containing no organic solvents, for repair car-refinishing, characterised in that the binder is composed of a polyurethane water-soluble resin. This primer features improved vertical application characteristics and a faster drying speed.

9 Claims, No Drawings

FILLER PRIMER CONTAINING NO ORGANIC SOLVENTS FOR REPAIR CAR-REFINISHING

BACKGROUND OF THE INVENTION

This invention concerns a filler primer for repair car-refinishing, and specifically a primer containing no organic solvents and featuring improved vertical application characteristics and a particularly rapid drying speed.

The purpose of filler primers in repair car-refinishing is to provide a protective coat for the body-work and at the same time to create a suitable undercoat for the enamel.

The composition of these primers is usually rather complex, involving pigments and extenders, binders, solvents and additives.

A primer must incorporate certain definite properties, the most important of which are a good vertical coatability and a relatively fast hardening time.

The binder plays a fundamental role in determining the above properties.

Currently-used primers contain polyacrylate resins as a binder. To create a proper receipe these resins must be dissolved in organic solvents, such as glycols, diacetone alcohol, butanol, or similar substances. The solvent reaches concentrations of between 8–15% in the final composition. Such high solvent concentrations create a serious environmental problem from two points of view, i.e. safety, and the health of the workers exposed to these solvents, not only at the level of preparation but also at the level of the final utilisation.

To this problem can be added further difficulties encountered in the utilisation of known primers, which do not exceed a verticality value of 20 μm at each coat, have unsatisfactory filling power and coverage, are liable to drip during the application, and need at least four hours to dry.

For the above-mentioned reasons, therefore, a primer containing no solvents is highly desirable. There is also a real need for a primer with improved application properties.

SUMMARY OF THE INVENTION

It has surprisingly been found that by using as binder a saturated aliphatic polyurethane resin that disperses in water, one obtains a repair car-refinishing primer that can be formulated in an aqueous medium, thus dramatically reducing the solvent level to almost zero.

In addition, this new primer invention overcomes other disadvantages encountered in known primers.

DETAILED DESCRIPTION OF THE INVENTION

In this invention, the binder consists of a saturated aliphatic polyurethane resin that disperses in water.

A resin should be elastic and unbreakable, and should adhere to various types of substrate.

A resin should, preferably, have a theoretical molecular weight of between 2,000 and 2,800.

In this particular resin the polyester part, which has a theoretical molecular weight of between 800 and 1,200, would normally contain residues of bifunctional linear aliphatic acids having from 6 to 12 carbon atoms, bound through a group of esters to residues of bifunctional linear polyhydric alcohols, having from 3 to 6 carbon atoms, and be further reformed with aromatic cycloaliphatics or aliphatics di-isocyanates. The viscosity is between 2,000 and 4,000 cps, and the dry residue (D.R.) is equal to 100%.

Examples of bifunctional linear aliphatic acids are adipic acid and azelaic acid.

Examples of bifunctional polyhydric alcohols are neopentyl glycol, hexylene glycol, and 1.3-butanediol.

Examples of di-isocyanates are toluene di-isocyanate, isophorone di-isocyanate, and hexamethylene di-isocyanate.

For the resin as used in this invention, the isocyanates are reformed beforehand with acids that perform hydroxylic functions, such as, for example, dimethylol propionic acid.

Resins of this type and with the properties described above are commercially available and can therefore be prepared using known methods. Examples of commercial products are IDROBE®201 W35 made by N. Benasedo, REALKILO®H25 made by Ferri, or similar products, as supplied for instance by U.C.B.

When preparing the resin, the polyester preparation process must be carried out in dry phase. The functionality of the polymer must be exclusively hydroxylic.

Once esterification is complete, the resin is reformed with the di-isocyanates as described above. The reaction between the isocyanic and hydroxylic reactive group of the polyester is stoichiometric. Hence, depending upon the ratio between the different moles in the reaction, it is possible to obtain polymers having different molecular weights and with differing ratios between the polyester and isocyanic parts, bearing in mind that there are no free isocyanic reactive groups. Extensions of the polymer can be obtained during the water-dispersion phase, using diamines of the isophorone-diamine type to obtain branched polymers with a higher molecular weight. The productive process can be performed in two ways:

1) directly in aqueous phase, in the presence of tertiary amines of the triethylamine type used as neutralisers, but with the attendant risk of obtaining low molecular weights;
2) in the organic phase, in the presence of water and a solvent, which would then be eliminated at the end of the reaction by distillation.

In this new invention the primer still contains conventional components, i.e. pigments, extenders and additives.

This invention has the advantage that water can be used as a solvent, the maximum presence of organic co-solvents being 0.5% w/w.

In this new invention the binder, consisting of the urethane resin described earlier, will be present in a concentration by weight of between 10% and 22%, preferably between 12% and 18%, and better still approx. 15–16%.

Titanium dioxide, yellow ferric oxides, calcium carbonate, barium sulphate, and talc are given as examples of conventional extenders and pigments.

Suitable organic solvents are aliphatic alcohols, such as isopropylic alcohols, or glycol ethers from ethylene glycol, for instance butyl glycol.

Anti flash-rusting (anti-corrosion), bentonites, co-polyacrylates, polysiloxanes, and thickeners are given as examples of additives.

Depending upon requirements, an expert in the art will easily be able to determine the quantities and ratios of the components.

The pigments and extenders may reach between 30% and 50% w/w, preferably about 40% w/w, whereas the additives may be present for a total of not more than about 1.5%.

The primer described in this invention has verticality characteristics in application equal to 50 μm dry per passage, and a hardening time of up to 120 mins at 20° C. (50% U.R.).

The following examples illustrate the invention in greater detail.

EXAMPLE 1

Preparation of the Polyurethane Resin.

General Formula for Obtaining Polyurethane Dispersion.

| Raw materials | | Weight |
|---|---|---|
| 1st stage | | |
| – Polyester (A) | | |
| Adipic Acid | | 198.0 |
| Neopentyl glycol | | 170.0 |
| | | 368.0 |
| Reaction water | – | 48.0 |
| | | 320.0 |

Reaction at 230–240° C. through Raschig ring columns
Final characteristics: Acidity no.=<1

| Vx {tq} | = | 3.100–3.500 cps |
|---|---|---|
| Theor. PM | = | 1.080 |
| Peq OH | = | 540 |
| % D.R. | – | 100 |

2nd stage

Urethane Pre-Polymer (B)

| Polyester A | 320.0 |
|---|---|
| Methyl ethyl ketone (MEK) | 233.0 |
| Dimethylol propionic acid | 41.0 |
| Dibutyl dilaurate (sol 1% mek) | 22.0 |
| Isophorone di-isocyanate | 200.0 |
| | 816.0 |

Urethane pre-polymer preparation for subsequent extension with diamine. Reaction temperature 60–65° C. Reaction complete at values of NCO =3.0–3.2% D.R.=68–69%.

$Vx\{tq\}$=1760–2050 cps.

3rd stage

Extension and Simultaneous Neutralisation and Dispersion of the Urethane Polymer

| Urethane pre-polymer B | 816.0 |
|---|---|
| Demineralised water | 1,347.0 |
| Triethylamine | 31.0 |
| Isophorone diamine | 52.0 |
| | 2,246.0 |
| Distillate (MEK) | –246.0 |
| | 2,000.0 |

The urethane pre-polymer is added to the aqueous solution and the two amines over a period of 30 minutes at 60° C.

The end of the reaction is determined by a value of NCO=0

Once the reaction is complete, the MEK can be distilled at a maximum temperature of 65° C.

FINAL CHARACTERISTICS:

| Aspect | opalescent |
|---|---|
| Vx {tq} cps | 85–250 |
| % 1 pH | 8–8.5 |
| NA {ss} | 28–30 |
| Nam {ss} | 28–30 |
| % N | 100 |
| Solvent | water |
| % D.R. | 29–31 |

EXAMPLE 2

Primer for car body-work
Using conventional techniques, a primer was prepared with the following composition:

PIGMENTS AND EXTENDERS

| | |
|---|---|
| 7.000 | Titanium dioxide |
| 3.000 | Yellow ferric oxide |
| 20.000 | Calcium carbonate or barium sulphate |
| 10.000 | Talc |
| | TOTAL OF PIGMENTS AND EXTENDERS = 40.000 |

BINDERS

| | |
|---|---|
| 15.750 | Dispers. water-soluble polyurethane |
| | TOTAL BINDERS = 15.750 |

SOLVENTS

| | |
|---|---|
| 0.389 | |
| 13.210 | Deionised water |
| 29.375 | |
| 42.974 | |
| 0.048 | Aliphatic alcohols |
| 0.317 | Butyl glycol |
| | TOTAL SOLVENTS = 43.339 |

ADDITIVES

| | |
|---|---|
| 0.125 | Anti flash-rusting |
| 0.240 | Bentonites |
| 0.240 | Acrylic copolymer |
| 0.125 | Polysiloxane |
| 0.175 | Polyurethane thickener |
| 0j.006 | Ammonia |
| | TOTAL ADDITIVES = 0.911 |
| | OVERALL TOTAL = 100.000 |

| | | |
|---|---|---|
| Density = 1.375 g/cm$^3$ | | Xylene + toluene = 0.0% |
| Density = 13.790 lb./gal (UK) | | Theor. Yield × 25 $\mu$m dry = 785.8 s.g. |
| Feet/gal (UK) | | |
| Density = 11.482 lb./gal (US) | | Theor. Yield × 25 $\mu$m dry = 654.2 s.g. |
| Feet/gal (US) | | |
| GM + extenders in weight | = 40.4% | Cons. weight × 10 $\mu$m dry = 34.3 g/cm$^3$ |
| Dry residue in weight | = 56.7% | Cons. Vol. × 101 $\mu$m dry = 24.9 cm$^3$/m$^2$ |
| Dry residue in vol. | = 40.1% | Theor. yield × 10 $\mu$m dry = 40.1 |
| PVC | = 46.93% | |
| Critical PVC | = 56.12% | |
| PVC/Critical PVC | = 0.04% | |
| V.O.C. | =0.05 lb./gal (UK) | |
| V.O.C. = 0.04 lb./gal (US) | | V.O.C. = 5 g/l |

It is claimed:

1. A primer for repair car-refinishing comprising between 30% and 50% by weight pigments and extenders, up to 1.5% by weight additives, between 10% and 22% by weight of a binder component, said pigments, extenders, additives, and binder being dispersed in from 26.5% to 60% by weight aqueous solvent, wherein the binder component consists essentially of a saturated aliphatic polyurethane resin that disperses in water, wherein said polyurethane resin is the reaction product of a trifunctional-polyol-free, amine-free polyester polyol component having a functionality that is exclusively hydroxylic, said polyester polyol prepared by reacting a bifunctional linear aliphatic acid with a bifunctional polyhydric alcohol in dry phase, with a stoichiometric amount of di-isocyanate to form a urethane pre-polymer, and subsequently extending said urethane pre-polymer with a diamine in a water-dispersion phase.

2. The primer as described in claim 1, characterised in that the maximum organic co-solvent component content is 0.5% by weight.

3. The primer as described in claim 1, characterised in that the saturated aliphatic polyurethane resin has a polyester portion that contains residues of bifunctional linear aliphatic acids having from 6 to 12 carbon atoms, bound through ester linkages to bifunctional polyhydric alcohol residues having from 3 to 6 carbon atoms.

4. The primer as described in claim 3, characterised in that the acid is adipic acid and the polyhydric alcohol is neo-pentyl glycol.

5. The primer as described in claim 1, characterised in that said diamine is the isophorone diamine.

6. The primer as described in claim 1, having the following composition in weight:

pigments and extenders 40% binder 15.75% aqueous solvents 43.34% additives 0.91%.

7. The primer of claim 1, wherein said pigments and extenders are selected from the group consisting of titanium dioxide, yellow ferric oxides, calcium carbonate, barium sulphate, and talc.

8. The primer of claim 1, wherein said additives are selected from the group consisting of anti-corrosion additives, bentonites, co-polyacrylates, polysiloxanes, and thickeners.

9. The primer of claim 1, having verticality characteristics in application equal to 50 $\mu$m dry per passage and a hardening time of up to 120 minutes at 20° C. (5% U.R.).

* * * * *